United States Patent [19]

Morrill

[11] Patent Number: 4,958,940
[45] Date of Patent: Sep. 25, 1990

[54] ELECTRIC MOTOR LUBRICATION

[76] Inventor: Wayne J. Morrill, 3448 S. Washington Rd., Ft. Wayne, Ind. 46804, Judith A. Morrill, Conservator

[21] Appl. No.: 320,767

[22] Filed: Mar. 8, 1989

Related U.S. Application Data

[63] Continuation-in-part of Ser. No. 220,982, Jul. 15, 1988, which is a continuation of Ser. No. 945,813, Dec. 24, 1986, abandoned.

[51] Int. Cl.⁵ ............................................. F16C 17/02
[52] U.S. Cl. .................................................... 384/398
[58] Field of Search ............... 384/398, 412, 399, 292, 384/373, 413, 411

[56] References Cited

U.S. PATENT DOCUMENTS 2,522,985 12/1945 Bradley .............................. 384/412
3,965,880 6/1976 Michael ............................... 384/292
4,671,676 6/1987 Chen et al. .......................... 384/292

Primary Examiner—Lenard A. Footland
Attorney, Agent, or Firm—Pearne, Gordon, McCoy & Granger

[57] ABSTRACT

An electric motor lubrication system and a method of making the same are disclosed. The motor is a unit bearing motor with an oil reservoir at the bottom of a vertically disposed shaft. The motor rotor has a shaft journaled in a bearing post on the frame, and the lower end of the post has two grooves to receive an oil-saturated wick. Each groove has a flat bottom which extends at at least a 5-degree angle relative to the shaft axis, and the intersection of the flat bottom with the shaft aperture forms a plow edge having a component of force directing oil toward the bearing upon shaft rotation. This readily supplies oil upwardly for a vertical shaft motor. The foregoing abstract is merely a resume of one general application, is not a complete discussion of all principles of operation or applications, and is not to be construed as a limitation on the scope of the claimed subject matter.

14 Claims, 4 Drawing Sheets

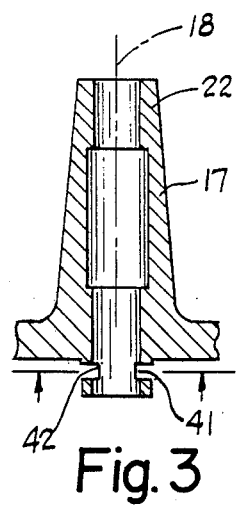
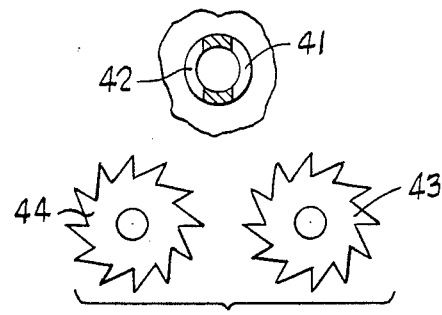
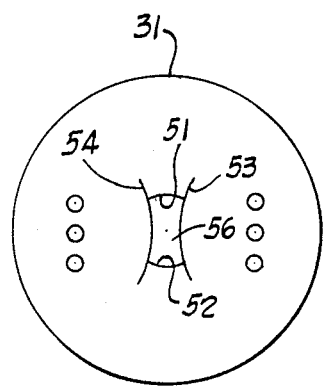
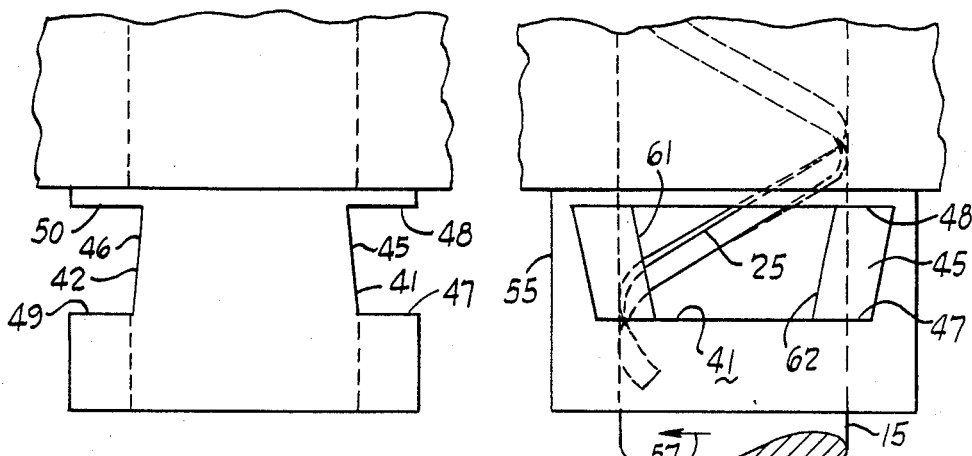

ELECTRIC MOTOR LUBRICATION

BACKGROUND OF THE INVENTION

This application is a continuation-in-part of application Ser. No. 07/220,982, filed July 15, 1988, which is a continuation of application Ser. No. 07/945,813, filed Dec. 24, 1986, now abandoned.

Small electric motors have long used a helical or spiral groove on the shaft of the unit bearing motor acting as a viscosity pump to move oil through the unit bearing. This is disclosed in U.S. Pat. No. 2,522,985, which also disclosed use of a single groove in one end of the bearing post to receive a wick. The groove established an oil access hole from the exterior of the bearing post to the shaft aperture in which the shaft was journaled. The wick touched the rotating surface of the shaft so that the shaft could wipe some oil from the wick, and it was then slowly moved by the viscosity pump along the shaft into the bearing. Such lubrication systems were quite satisfactory for normal life motors with a horizontal shaft.

In recent years, greater emphasis has been placed on extremely long life motors. i.e. those which would run for 10 to 20 years without relubrication. For example, in refrigerator or freezer compartments, small air circulating fans were used in locations which made it extremely difficult to relubricate and the manufacturer could not rely upon the household user to relubricate the fan, yet the householder was extremely annoyed at having the motor fail, with the consequent high cost of field replacement.

Another problem was the lubrication of such motors with vertical shafts and how to supply a sufficient quantity and reliability of oil feed through the bearing.

SUMMARY OF THE INVENTION

The problem to be solved, therefore, is how to construct a unit bearing electric motor with a positive and reliable oil feed of the bearing even though the motor is used in any position including vertical shaft applications.

This problem is solved by a lubrication system for a bearing of an electric motor comprising, in combination, a stator, a bearing fixed relative to said stator and having a shaft aperture, an oil reservoir for said bearing, a rotor having a shaft journaled in said bearing shaft aperture and coaxially disposed to cooperate with said stator, an oil access hole in said bearing for access of oil from said oil reservoir to the circumferential surface of said shaft, a generally helical oil groove in the external surface of said shaft extending from said oil access hole longitudinally into said bearing, first and second edges on said oil access hole, said first edge being a first counterclockwise plow edge on the downstream edge relative to a counterclockwise rotational direction of said shaft, said second edge being a first clockwise plow edge on the downstream edge relative to a clockwise rotational direction of said shaft, and each said plow edge being disposed at an angle relative to the shaft axis to have a component of force directing oil longitudinally into said bearing for said counterclockwise and clockwise rotational directions, respectively.

The problem is further solved by a method of making a lubrication system for an electric motor having a rotor on a shaft journaled in an aperture in a bearing post for cooperation of the rotor with a stator, comprising the steps of utilizing a machine tool to cut a groove in the bearing post from the outer surface through to said shaft aperture to form an oil access hole, said groove being near one end of said bearing post and having first and second side walls, with the first side wall being closest to said one end of the bearing post, the cutting of said groove being deeper at said second side wall than at said first side wall, forming an oil reservoir for said bearing post, and providing oil communication from said oil reservoir to said oil access hole.

Accordingly, an object of the invention is to provide an improved lubrication system for an electric motor bearing.

Another object of the invention is to provide an electric motor bearing lubrication system with oil applied to a plow edge which directs the oil into the bearing.

Other objects and a fuller understanding of the invention may be had by referring to the following description and claims, taken in conjunction with the accompanying drawing.

BRIEF DESCRIPTION OF THE DRAWING

FIG. 3 is a partial sectional view on line 3—3 of FIG. 2;

FIG. 4 is an end view of the bearing post of FIG. 3, diagrammatically showing the milling cutters for the grooves;

FIG. 5 is an elevational view of the wick used in the lubrication system;

FIG. 6 is an enlarged, partial view showing one of the grooves in the bearing post;

FIG. 7 is an enlarged, partial view taken at right angles to FIG. 6;

DETAILED DESCRIPTION OF THE PREFERRED EMBODIMENT

Figure 1:
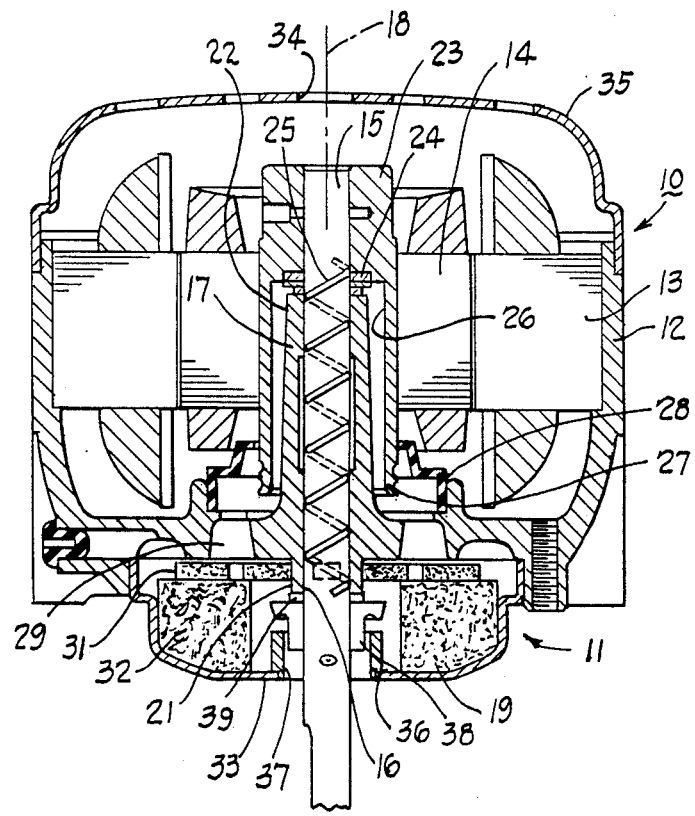
FIG. 1 is a longitudinal, sectional view of a motor embodying the improved lubrication system.
Figure 2:
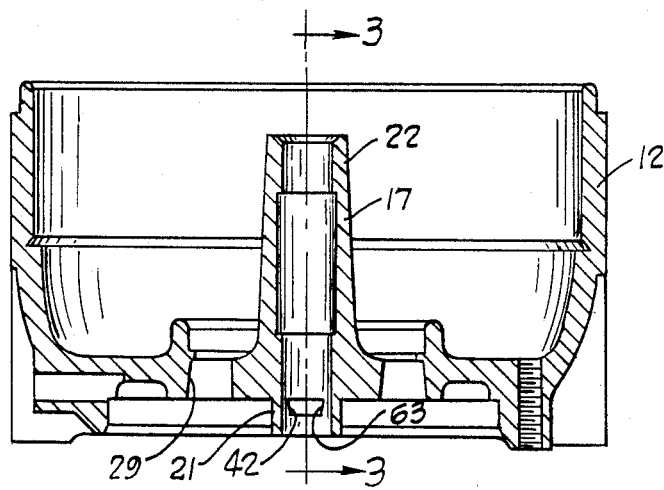
FIG. 2 is a longitudinal, sectional view of the motor frame.

The figures of the drawing show an electric motor 10 incorporating the lubrication system 11 of the invention. This electric motor 10 has a frame 12 which carries a laminated, magnetically permeable stator 13 cooperating with a laminated rotor 14 mounted on a shaft 15. The motor 10 is shown as a unit bearing motor, with the shaft 15 journaled in a shaft aperture 16 of a bearing post 17, which in this embodiment is unitary with the frame 12. The lubrication system 11 may be used with horizontal shaft motors, but, to show the superiority of the present lubrication system, the motor is illustrated as a vertical shaft motor, namely, with the axis 18 of the shaft vertical. The lubrication system 11 is provided with an oil reservoir 19 near a first end 21 of the post 17. The post has a second end 22, in this case at the upper vertical end. In this embodiment, the rotor 14 is mounted on a hub 23 and supported by one or more thrust bearing washers 24 on the upper end 22 of the post. The shaft 15 has throughout most of the length of the unit bearing in the post 17 a helical groove 25, which acts as a viscosity pump to move oil from the oil reservoir 19 upward along the shaft in the clearance between this shaft 15 and the aperture 16, then by centrifugal force to the inner skirt 26 of the hub 23, from whence the oil migrates downwardly, aided by centrifugal force, to an oil thrower 27 at the lower end of the hub, again thrown by centrifugal force to an oil catcher 28. Preferably, on the inside of the oil catcher 28 is a soft surface cloth 30. This prevents the oil striking the surface from breaking up into an oil mist which might be carried out of the motor to lose lubrication, especially in a shaft down construction, as shown in FIG. 1, wherein the oil reservoir is not sealed. The oil from the oil catcher is returned to the oil reservoir 19. The oil flows through oil return holes 29 in the frame 12, to a wick 31, and other wicking 32 inside an oil cap 33 on the frame 12, to close the oil reservoir 19. The shaft 15 may extend upwardly through an aperture 34 in an upper frame cap 35, if the load is above the motor or, as shown, the shaft 15 may extend downwardly through an aperture 36 in the oil reservoir cap 33. In this construction, the oil cap 33 is provided with a cylindrical shield 37 and the shaft is provided with an oil thrower 38 rotating with the shaft and separated from the first end 21 of the post by a thrust bearing washer 39.

The lubrication system 11 includes at least one groove 41 in the first end 21 of the post 17, to receive the wick 31. The preferred embodiment also includes a second groove 42 which is generally diametrically opposite the first groove (see FIGS. 6 and 7). In the preferred embodiment, the two grooves are machined at the same time by first and second milling cutters 43 and 44 (FIG. 4) which are moved in the plane of the paper of FIG. 4. Each milling cutter is moved in a path in this plane, which is normal to the shaft axis 18, and in the preferred embodiment the two milling cutters are located on parallel axes spaced apart and parallel to the shaft axis 18. These two milling cutters are moved in translation, upward as shown in FIG. 4, to mill the two grooves 41 and 42 in the post 17. These milling cutters may be Woodruff key cutters which have been modified and sharpened such that the teeth are at an angle of about at least 5 degrees, perhaps 10 degrees, relative to the shaft axis 18. By such sharpening or forming of the milling cutter teeth, the grooves 41 and 42 have flat bottom surfaces 45 and 46, respectively, the first groove 41 has parallel walls 47 and 48 and, similarly, the second groove 41 has parallel walls 49 and 50.

The wick 31 is shown in FIG. 5, and it has arcuate cuts 51 and 52 on equal radii to engage the outer, generally cylindrical surface 55 of the post first end 21. The wick also has arcuate cuts 53 and 54 on a larger radius, and these establish an opening 56 so that the wick 31 may be slipped over the end 21 of the post 17, and then the arcs 53 and 54 will engage the surface of the shaft 15 in the grooves 41 and 42, which are oil access holes. The two arcs 53 and 54 of the wick 31 engaging opposite sides of the shaft 15 are a means to balance the generally radially directed forces between opposite sides of the shaft and the wick to assure positive oil feed from the wick to the shaft for either direction of rotation. This is accomplished without pinning the wick to the stator or frame, as was the usual prior art practice. In pinning, one could not be assured that each arc 53 and 54 of the wick would have the same pressure against the side of the shaft. By this means, positive oil feed is achieved regardless of which direction of rotation the motor is designed to run.

Oil is provided in the lubrication reservoir 11, and the wick 31 is a means to apply oil from that oil reservoir 19 to the surface of the shaft 15 at these access holes. As shown in FIG. 6, the shaft 15 has the helical groove 25 at the grooved portion of the bearing post 17, and this acts as a viscosity pump to move oil along the shaft between the shaft surface and the shaft aperture. In this case, this viscosity pump will move oil vertically upwardly to the upper end 22 of the post 17. This provides a lubricant film and also helps to cool the bearing. This is with shaft rotation counterclockwise looking from the load end of the motor, as shown by the arrow 57, or clockwise as viewed from the top of the motor.

An important feature of the invention is that the intersection of the flat bottom surface 45 of groove 41, with the shaft aperture 16, provides first and second intersection lines 61 and 62. This second intersection line 62 has little function in this embodiment; however, the first intersection line 61 acts as a counterclockwise plow edge, so that upon counterclockwise shaft rotation viewed from the load end, this plow edge has a component of force directing oil axially toward the majority of the length of the shaft aperture 16. This is a vertically upward force along the vertical axis of the shaft, and has been found to be quite effective in supplying lubricant to the bearing. A similar second, counterclockwise plow edge 63 is formed at the intersection of the flat bottom surface 46 of the second groove 42 with the shaft aperture, and this second counterclockwise plow edge 63 is substantially diametrically opposite the first plow edge 61. The second intersection line 62 and the diametrically opposite edge 64 become first and second clockwise plow edges relative to clockwise rotation of the shaft and pump oil upwardly towards the bearing.

A prior art groove had an intersection of the groove with the shaft aperture, but this intersection line was parallel to the shaft axis and had no component of force directing oil toward the bearing. The present invention greatly improves the feed of oil to the bearing, and it has been found to pump oil through the bearing at about 5 to 10 drops per minute, whether the motor is horizontally or vertically disposed. The prior art systems often took as much as 30 minutes before they could prime themselves to pump oil vertically upwardly even though they had the helical oil groove in the shaft similar to groove 25. During this 30-minute period, with the bearing not being suitably lubricated by oil film, damage could be done to the shaft or bearing due to insufficient lubrication. If the oil refuses to flow for a long period, such as 30 minutes, the shaft and bearing can overheat due to friction, and this can carbonize the oil, with subsequent damage to the bearing and shaft combination.

The lubrication system of the present invention has been shown with a plain bearing, and would also be usable with other types of bearings, such as needle bearings or ball or roller bearings. These counterclockwise plow edges 61 and 62, it will be noted, are on the downstream edge of the oil access hole relative to the counterclockwise rotational direction of the shaft. The wick 31 is easy to snap into place in the two grooves 41 and 42, and will be held therein by the arcuate cuts 53 and 54 in the wick, without any additional means of support for the wick. The additional wicking 32 provides additional storage space for oil in the oil reservoir 19, and helps feed oil to the wick 31 so that it may supply oil to the bearing.

The method of making the lubrication system is readily accomplished by the specially sharpened milling cutters, which are moved in translation in the plane of FIG. 4, which is normal to the shaft axis. This forms at least one plow edge and, with the two milling cutters used, it forms the two plow edges 61 and 63 substantially simultaneously. Only one milling cutter need be used if the motor is indexed 180 degrees after the first pass, so that the second groove may be milled. It has been found that one plow edge is satisfactory for a horizontal shaft motor, but that two plow edges can supply approximately twice as much oil, and are preferred for vertical shaft motors.

Figure 8:
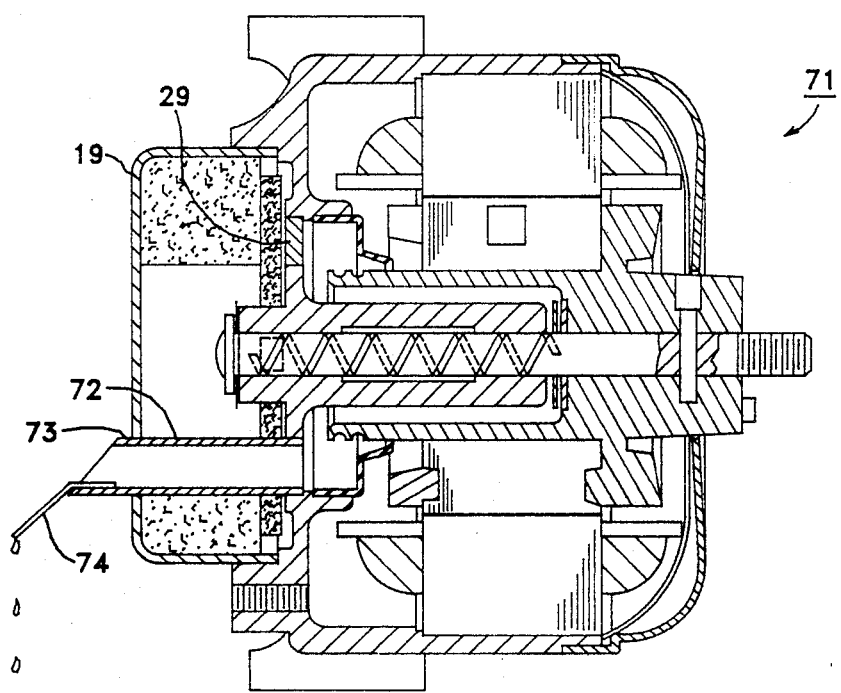
FIG. 8 is a longitudinal sectional view of a motor prepared for a test setup.

FIG. 8 shows a motor 71 constructed for test purposes. This motor is quite similar to that of FIG. 1 except for horizontal shaft applications and the shaft has been extended out the front of the motor rather than the rear of the motor, as in FIG. 1. There generally are a plurality of oil return holes 29, and in the test motor 71 of FIG. 8, all but one of these oil return holes have been plugged, for example, with liquid steel. In the one hole not plugged, a metal tube 72 is sealed in the frame 12 and also sealed in an aperture 73 at the rear of the lubricant reservoir 19. A paper pointer 74 is glued to the inside of the tube 72, allowing oil to drip off the point of this paper pointer.

Chart 1 shows three different motors constructed to determine if the plow edges should be at a 0-degree angle, a 5-degree angle, or a 10-degree angle relative to the shaft axis. This chart shows that the 5-degree and 10-degree angles were superior to the 0-degree angle because each started oil flowing quicker. The 5-degree angle was considered superior to the 10-degree angle because of the more consistent flow of oil. In each case, the oil stopped dripping because oil was being pumped out of the reservoir and not being replenished.

CHART 1

TEST TO DETERMINE IF USE NO ANGLE, 5-DEGREE ANGLE, OR 10-DEGREE ANGLE ON BEARING SLOT

| TIME | NO ANGLE | 5-DEGREE ANGLE | 10-DEGREE ANGLE |
|---|---|---|---|
| Oil started to drip in: | | | |
| 27 min. | | 14 min. | 20 min. |
| 5 min. | 8 drops/min. | 7 drops/min. | 8 drops/min. |
| 10 min. | 6 drops/min. | 7 drops/min. | 6 drops/min. |
| 15 min. | 6 drops/min. | 7 drops/min. | 4 drops/min. |
| 20 min. | 5 drops/min. | 6 drops/min. | 2 drops/min. |
| 25 min. | 3 drops/min. | 7 drops/min. | 1 drops/min. |
| 30 min. | 4 drops/min. | 7 drops/min. | 1 drops/min. |
| 35 min. | 4 drops/min. | 7 drops/min. | 1 drops/min. |
| 40 min. | 2 drops/min. | 6 drops/min. | 1 drops/min. |
| 45 min. | 3 drops/min. | 4 drops/min. | 1 drops/min. |
| 50 min. | 1 drops/min. | 4 drops/min. | 1 drops/min. |
| 55 min. | 3 drops/min. | 5 drops/min. | 2 min. 1 drop |
| 60 min. | 3 drops/min. | 2 drops/min. | 2 min. 1 drop |
| 65 min. | 1 drops/min. | 2 drops/min. | 3 min. 1 drop |
| 70 min. | 4 drops/min. | 4 drops/min. | 4 min. 1 drop |
| 75 min. | 1 drops/min. | 1 drops/min. | oil stopped dropping |
| 80 min. | 3 min. 1 drop | 1 drops/min. | |
| 85 min. | 3 min. 1 drop | 1 drops/min. | |
| 90 min. | 3 min. 1 drop | 1 drops/min. | |
| 95 min. | 3 min. 1 drop | 1 drops/min. | |
| 100 min. | 4 min. 1 drop | 1 drops/min. | |
| 105 min. | 4 min. 1 drop | 1 drops/min. | |

Chart 2 is a direct comparison of the new versus old oiling system, the old oiling system being only one groove 41 instead of the two grooves 41 and 42. Such single groove had groove edges which were parallel to the shaft axis, whereas the new system had the two grooves and the two plow edges, for counterclockwise rotation, for example, each of which was at a 5-degree angle. One motor each was tested, and in the new oil system, the oil started dripping after 12 minutes, and this was priming the system and filling the entire system full of oil out to the paper pointer 74. This chart, too, showed the superiority of the new system over the old in quicker flow of oil and more consistent flow of oil. Lack of sufficient lubrication can lead to carbonizing of the oil in the overheated bearing. The heat conductivity of the aluminum end ring and the aluminum hub 23 conducts heat out of the bearing so that the bearing post 17 remains cool during normal running operation and also under a locked-rotor condition.

CHART 2

DIRECT COMPARISON OF NEW VERSUS OLD OILING SYSTEM 10-29-85 1 Motor each
Old system started dripping after 17 minutes
New system started dripping after 12 minutes

| TIME | OLD SYSTEM | NEW SYSTEM 5-DEGREE ANGLE |
|---|---|---|
| 5 min. | 6 drops per min. | 10 drops per min. |
| 10 min. | 5 drops per min. | 11 drops per min. |
| 15 min. | 4 drops per min. | 11 drops per min. |
| 20 min. | 4 drops per min. | 11 drops per min. |
| 25 min. | 3 drops per min. | 6 drops per min. |
| 30 min. | 3 drops per min. | 4 drops per min. |
| 35 min. | 2 drops per min. | 4 drops per min. |
| 40 min. | 2 drops per min. | 4 drops per min. |
| 45 min. | 2 drops per min. | 5 drops per min. |
| 50 min. | 2 drops per min. | 5 drops per min. |
| 55 min. | 1 drops per min. | 4 drops per min. |
| 60 min. | 1 drop 1 min. 20 sec. | 2 drops per min. |
| 65 min. | 1 drop 1 min. 20 sec. | 3 drops per min. |
| 70 min. | 1 drop 1 min. 6 sec. | 3 drops per min. |
| 75 min. | 1 drop 1 min. 6 sec. | 2 drops per min. |
| 80 min. | 1 drop 1 min. 25 sec. | 2 drops per min. |
| 85 min. | 1 drop 1 min. 20 sec. | 2 drops per min. |
| 90 min. | 1 drop 1 min. 20 sec. | 1 drops per min. |
| 95 min. | 1 drop 1 min. 20 sec. | 2 drops per min. |
| 100 min. | 1 drop 1 min. 52 sec. | 2 drops per min. |
| 105 min. | 1 drop 1 min. 50 sec. | 2 drops per min. |

Chart 3 shows an oil test on a field-reject motor which had the old lubrication system. This shows that it took one hour and 15 minutes for the oil to start dripping, which is much too long, and therefore shows that the old oil system with the single groove and an edge parallel to the shaft is not satisfactory.

Figure 9:
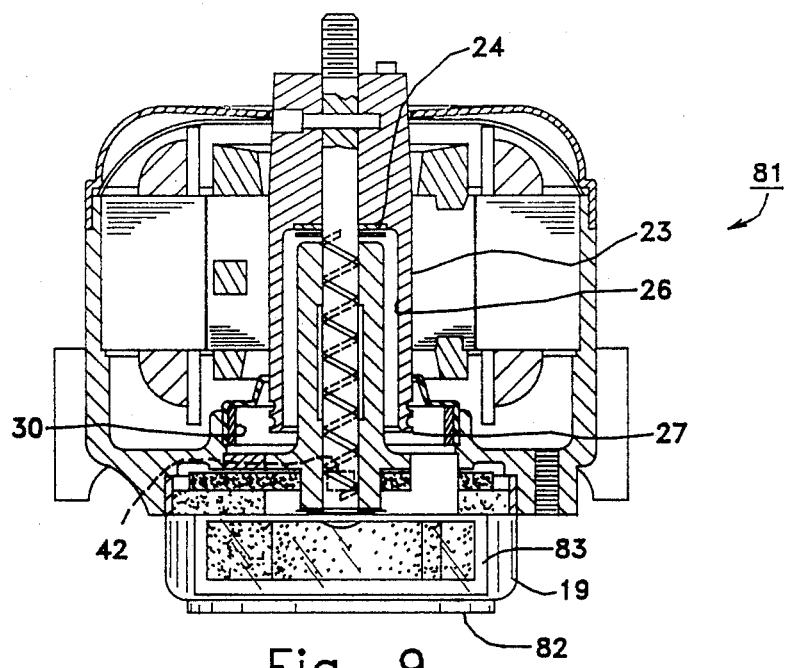
FIG. 9 is a longitudinal sectional view of a vertical shaft motor prepared for a different test setup.
Figure 10:
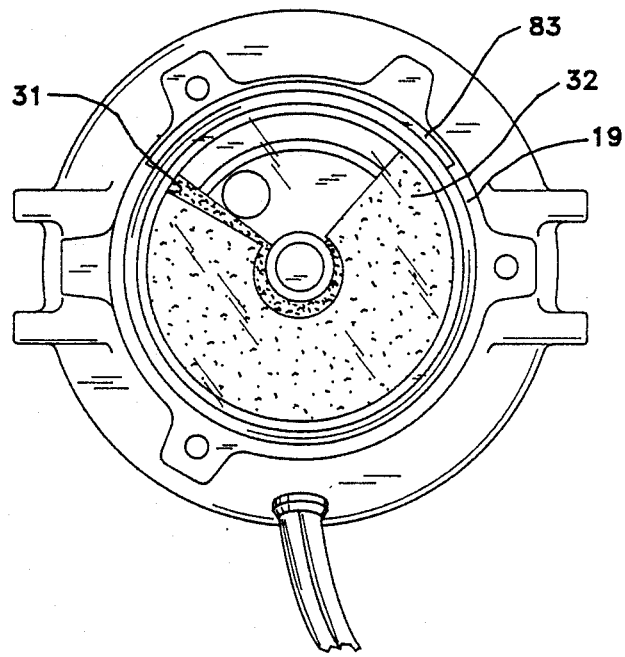
FIG. 10 is an end view of the motor of FIG. 9.

FIGS. 9 and 10 show a motor 81 prepared for test. The rear of the oil reservoir 19 has been cut off and a glass plate 82 cemented thereon so that one may see the oil reservoir wicking 32 and the oil application wick 31 and also see one of the grooves 41 or 42. Also, a 90-degree arcuate section of the side of a reservoir 19 is cut away and a transparent arcuate window 83 cemented over the opening, again so that one may better observe the groove 41.

CHART 3

OIL TEST SAME MOTOR AS FIELD-REJECT BUT NEW MOTOR NO. 1

| RUNNING TIME | DROPS PER MINUTE |
|---|---|
| It took 1 hour 15 minutes to start dripping | |
| 5 minutes | 1 drop 6 min. 25 seconds |
| 10 minutes | 1 drop 6 min. 32 seconds |
| 15 minutes | 1 drop 4 min. 59 seconds |
| 20 minutes | 1 drop 5 min. 20 seconds |
| 25 minutes | 1 drop 3 min. 58 seconds |
| 30 minutes | 1 drop 3 min. 41 seconds |
| 35 minutes | 1 drop 3 min. 44 seconds |
| 40 minutes | 1 drop 4 min. 9 seconds |
| 45 minutes | 1 drop 4 min. 21 seconds |
| 50 minutes | 1 drop 3 min. 51 seconds |
| 55 minutes | 1 drop 3 min. 20 seconds |
| 60 minutes | 1 drop 3 min. 37 seconds |
| 65 minutes | 1 drop 4 min. 3 seconds |
| 70 minutes | 1 drop 5 min. 24 seconds |

CHART 3-continued

OIL TEST SAME MOTOR AS FIELD-REJECT
BUT NEW MOTOR NO. 1

| RUNNING TIME | DROPS PER MINUTE |
| --- | --- |
| 75 minutes | 1 drop 4 min. 27 seconds |
| 80 minutes | 1 drop 5 min. 15 seconds |
| 85 minutes | 1 drop 5 min. 33 seconds |

For chart 4, motors like those shown in FIGS. 9 and 10 were dispersed with a horizontal axis and a shortened tube 72 was provided in the only open oil return hole 29 and fitted with a paper pointer so that the oil drips could be observed and counter. Six such motors were prepared for test and this Chart 4 shows that oil started dripping in about 3 to 6 minutes, to show the superiority of the new oiling system.

CHART 4

NEW OILING SYSTEM
ON MOTOR SAME AS FIELD-REJECT

| TIME Oil started to drip in: | #1 3:30 | #2 2:45 | #3 5:42 | #4 3:20 | #5 6:00 | #6 6:15 | Minutes |
| --- | --- | --- | --- | --- | --- | --- | --- |
| 5 | 7 | 13 | 4 | 7 | 3 | 3 | drops/min. |
| 10 | 7 | 13 | 4 | 8 | 4 | 3 | drops/min. |
| 15 | 7 | 13 | 5 | 7 | 3 | 3 | drops/min. |
| 20 | 7 | 14 | 4 | 7 | 3 | 3 | drops/min. |
| 60 | 6 | 12 | 4 | 7 | 3 | 3 | drops/min. |
| 120 | 6 | 10 | 4 | 7 | 3 | 3 | drops/min. |
| 180 | 6 | 11 | 4 | 6 | 3 | 3 | drops/min. |
| 240 | 6 | 9 | 4 | 7 | 3 | 3 | drops/min. |
| 300 | 6 | 9 | 5 | 6 | 3 | 3 | drops/min. |
| 360 | 6 | 9 | 5 | 6 | 3 | 3 | drops/min. |

Chart 5 shows tests of field-reject and from-the-line motors which were ESPL motors, a type with a vertical shaft. All four of these had the old oiling system of one groove and the edge parallel to the shaft axis. In each of these four cases, the motors were prepared with glass plates 82, as in FIGS. 9 and 10, for observation of oil to be dripped from the tube 72. However, Chart 5 shows that no oil drips appeared in the tube 72, and the motors stopped running after the indicated time period of 1½ to 3½ hours. Two of the motors were field-returned motors, and two were from the line newly built, as shown in Chart 5. This shows the poor performance of the old oiling system.

CHART 5

OIL TEST ESPL FIELD FAILURE
AND FROM LINE OLD OILING SYSTEM

| 11/1/85 | TEST 1 | Motor returned, old-style oiling system. Started motor and ran 1 hour, 30 minutes. No oil appeared in tube. |
| --- | --- | --- |
| 11/4/85 | TEST 2 | Motor returned, old-style oiling system. Started motor, ran for 2 hours. No oil appeared in tube. |
| 11/5/85 | TEST 3 | Motor from line newly built, old oiling system. Ran motor 3 hours, 30 minutes. No oil appeared. |
| 11/26/85 | TEST 4 | Motor from line newly built, old oiling system. Ran motor 2 hours, 53 minutes. No oil appeared. |

Chart 6 shows the vertical shaft motor disposed vertically, as in FIGS. 9 and 10, again with shortened oil drip tube 72 dripping onto the glass plate 82. This Chart 6 shows that the three motors started dripping oil within a satisfactorily short time and had a fairly uniform oil flow until the test was discontinued. Oil was being recirculated in this system because it did not get out of the oil reservoir 19.

The motor of FIGS. 9 and 10 can be operated in a position 180 degrees from that shown, namely, with the shaft out the front end of the motor and the shaft down. In such case, the oil is pumped out of the unit bearing at the thrust bearing washers 24 and, by centrifugal force, is moved to the inside of the hub 23 at the inner skirt 26. Centrifugal force and a leveling of the oil on the skirt cause the oil to climb vertically upwardly to the oil thrower 27, where it is thrown by centrifugal force onto the soft surface 30 and returned to the oil reservoir 19. When the motor is stopped, a very small amount of oil will collect in the bottom of the hub 23, but since the viscosity pump is not working, no more oil is fed to that point, when the motor starts again, the oil quickly moves up the inner skirt 26 to return to the reservoir.

CHART 6

OIL TEST ESPL USING NEW OILING SYSTEM

| TIME Oil started to drip in: | MOTOR #1 22 min. | MOTOR #2 32 min. | MOTOR #3 15 min. |
| --- | --- | --- | --- |
| 5 | 5 | 4 | 15 |
| 10 | 5 | 7 | 14 |
| 15 | 7 | 10 | 15 |
| 20 | 7 | 10 | 15 |
| 25 | 8 | 9 | 16 |
| 30 | 8 | 9 | 15 |
| 35 | 8 | 9 | 16 |
| 40 | 9 | 8 | 17 |
| 45 | 10 | 8 | 17 |
| 50 | 10 | 8 | 17 |
| 55 | 9 | 7 | 16 |
| 60 | 10 | 7 | 17 |
| 65 | 10 | 7 | 16 |
| 70 | 10 | 7 | 16 |
| 75 | 10 | 7 | 15 |
| 80 | 11 | 7 | 12 |
| 85 | 10 | 6 | 12 |
| 90 | 11 | 6 | 14 |
| 95 | 11 | 7 | 12 |
| 100 | 11 | 7 | 12 |
| 105 | 11 | 8 | 12 |

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A lubrication system for a bearing of an electric motor comprising, in combination:
   a stator;
   a bearing fixed relative to said stator and having a shaft aperture;
   an oil reservoir for said bearing:
   a rotor having a shaft journaled in said bearing shaft aperture and coaxially disposed to cooperate with said stator;
   an oil access hole in said bearing for access of oil from said oil reservoir to the circumferential surface of said shaft:
   a generally helical oil groove in the external surface of said shaft extending from said oil access hole longitudinally into said bearing;
   first and second edges on said oil access hole:

said first edge being a first counterclockwise plow edge on the downstream edge relative to a counterclockwise rotational direction of said shaft;

said second edge being a first clockwise plow edge on the downstream edge relative to a clockwise rotational direction of said shaft and each said plow edge being disposed at an angle relative to the shaft axis to have a component of force directing oil longitudinally into said bearing for said counterclockwise and clockwise rotational directions, respectively.

2. A bearing lubrication system as set forth in claim 1, including a wick extending from the surface of said shaft at said oil access hole to said oil reservoir.

3. A bearing lubrication system as set forth in claim 2, including hole means in said bearing to balance the generally radially directed forces between opposite sides of said shaft and said wick to assure positive oil feed from said wick to said shaft for either direction of rotation.

4. A bearing lubrication system as set forth in claim 1, including an oil slinger on said rotor and a soft surface material radially outwardly of said oil slinger to absorb the oil slung from said oil slinger with a minimum of oil mist and splatter.

5. A bearing lubrication system as set forth in claim 1, wherein said counterclockwise plow edge is disposed at at least 5 degrees relative to the shaft axis.

6. A bearing lubrication system as set forth in claim 1, including a wick having an arcuate surface extending into said oil access hole to supply oil to the circumferential surface of the shaft.

7. A bearing lubrication system as set forth in claim 1, wherein said bearing is a plain bearing.

8. A bearing lubrication system as set forth in claim 1, including a substantially parallel-walled groove extending into said bearing to said shaft aperture to establish said oil access hole.

9. A bearing lubrication system as set forth in claim 8, including a substantially flat bottom surface on said groove extending at at least a 5-degree angle relative to the shaft axis and establishing said counterclockwise plow edge at an intersection with said shaft aperture.

10. A bearing lubrication system as set forth in claim 1, including a second oil access hole in said bearing substantially diametrically opposite the first-mentioned oil access hole.

11. A bearing lubrication system as set forth in claim 10, including a second counterclockwise plow edge on said second oil access hole on the downstream edge relative to the counterclockwise rotational direction of said shaft.

12. A bearing lubrication system as set forth in claim 11, including first and second substantially parallel walled grooves extending into said bearing to said shaft aperture at substantially diametrically opposite sides to form said two oil access holes.

13. A bearing lubrication system as set forth in claim 12, including a substantially flat bottom surface on each of said grooves extending at at least a 5-degree angle relative to said shaft axis and establishing said two counterclockwise plow edges at an intersection of each groove with said shaft aperture.

14. A bearing lubrication system as set forth in claim 11, including a second clockwise plow edge on said second oil access hole on the downstream edge relative to the clockwise rotational direction cf said shaft.

* * * * *